United States Patent
Pauer

(10) Patent No.: US 6,532,813 B1
(45) Date of Patent: Mar. 18, 2003

(54) METHOD AND DEVICE FOR DETERMINING A FILL LEVEL OF LIQUID IN A CONTAINER

(75) Inventor: Bernd Pauer, Eppstein (DE)

(73) Assignee: Mannesmann VDO AG, Frankfurt am Main (DE)

( * ) Notice: Subject to any disclaimer, the term of this patent is extended or adjusted under 35 U.S.C. 154(b) by 43 days.

(21) Appl. No.: 09/654,649

(22) Filed: Sep. 5, 2000

(30) Foreign Application Priority Data

Sep. 4, 1999 (DE) .......................... 199 42 377

(51) Int. Cl.⁷ .................. G01F 23/00; G01F 23/60; G01F 23/56; E21B 47/10; B65B 1/30
(52) U.S. Cl. .................. 73/290 R; 73/313; 73/319; 73/152.29; 141/95
(58) Field of Search .................. 340/618; 324/418, 324/423; 702/55; 141/95; 73/290 R, 291, 299, 301, 302, 313, 319, 152.29

(56) References Cited

U.S. PATENT DOCUMENTS 4,353,245 A * 10/1982 Nicolai .................. 73/49.2
4,856,343 A    8/1989 Hon
5,038,611 A * 8/1991 Weldon et al. ............ 73/290 V
5,226,320 A * 7/1993 Dages et al. ............... 73/290 V
5,654,502 A * 8/1997 Dutton .................... 73/152.18

FOREIGN PATENT DOCUMENTS

| DE | 40 10 763 | 11/1990 | .......... G01F/23/22 |
| DE | 690 08 678 | 8/1994 | .......... D06F/35/00 |
| DE | 197 00 372 | 7/1998 | .......... G01F/23/14 |
| GB | 2 273 562 | 6/1994 | .......... G01F/23/14 |

* cited by examiner

Primary Examiner—Daniel S. Larkin
Assistant Examiner—Katina Wilson
(74) Attorney, Agent, or Firm—Cohen, Pontani, Lieberman & Pavane

(57) ABSTRACT

During the determination of a fill level of liquid in a container, a measuring chamber, in which there is initially the same fill level as in the container, is completely filled with liquid. The time required for completely filling the measuring chamber is measured and compared with previously determined values. The fill level in the container is then determined by comparison of the measured values with the known values.

15 Claims, 3 Drawing Sheets

METHOD AND DEVICE FOR DETERMINING A FILL LEVEL OF LIQUID IN A CONTAINER

BACKGROUND OF THE INVENTION

1. Field of the Invention

The invention relates to a method and device for determining a fill level of liquid in a container, in particular a level of fuel in a fuel tank of a motor vehicle.

2. Description of the Related Art

Lever transmitters with a float are typically used to determine a fill level of a liquid in a container. The float is connected to a pivotally mounted lever so that the float follows the liquid fill level in the container and pivots the lever which is connected to a potentiometer. The output of the potentiometer is a function of the fill level. The potentiometer is connected to an evaluation unit which converts electric signals into a fill level which corresponds to the volume of liquid present in the container. A disadvantage of this device is that the pivotal lever requires very large dimension of movement space inside the container making it difficult to arrange the lever in fuel tanks of modern motor vehicles which comprise complicated shapes to achieve compactness.

SUMMARY OF THE INVENTION

It is an object of the present invention to create a method for determining the fill level of liquid in a container which can be applied virtually independently of the geometry of the container to determine the fill level. Furthermore, it is also an object of the present invention to provide a device for determining the fill level of liquid in a container of virtually any shape.

The object of the present invention is met by a method including the step of completely filling or emptying a measuring chamber at a known pressure difference, the measuring chamber extending above the maximum level of the fuel tank to be measured and connected to the fuel tank. The time required for the filling or emptying of the measuring chamber is then determined and converted into the fill level in the container.

This method determines the fill level of liquid in the container via the rate at which the measuring chamber is emptied or filled. Since the measuring chamber is connected to the fuel tank, a fill level in the measuring chamber at the starting point of the method according to the invention, i.e., before the step of measuring or emptying the measuring chamber, corresponds to the fill level in the fuel tank. The time interval required for completely filling or emptying the measuring chamber is therefore a measure of the fill level in the container. The geometry of the measuring chamber and of the fuel tank exerts virtually no influence during the determination of the fill level using the method according to the invention. Accordingly, the measuring chamber does not have to be arranged vertically and may therefore be arranged at a slant or be bent.

The determination of the fill level in the container requires a particularly low computational outlay when the time determined for filling the measuring chamber is compared with a previously determined volume/level characteristic. The measuring chamber may therefore additionally have varying cross sections from the top end to the bottom end.

The object of the present invention is also met by a measuring chamber connected to the container which extends above the maximum level to be measured. The measuring chamber has a connection to a driven liquid delivery means and is designed to determine the time interval required for filling or emptying the measuring chamber. An evaluation unit is designed to calculate the fill level in the container from the time interval to determined.

This configuration according to the present invention requires no lever transmitter of projecting shape. Since the measuring chamber is connected to the container, the liquid respectively has the same fill level in the measuring chamber and in the container at the time before the level is to be determined. The time interval which is required to empty or fill the measuring chamber at a known delivery rate is a measure of the fill level in the fuel tank. The geometry of the measuring chamber and of the fuel tank exerts virtually no influence during determination of the fill level using the device according to the present invention. Therefore, the measuring chamber may, for example, be arranged at a slant or be bent. The measuring device may also subsequently use the fill level to calculate the volume of liquid in the container.

In accordance with an embodiment of the present invention, the measuring chamber is designed with a particularly simple shape such as, for example, a tubular shape.

The fact that the measuring chamber has been emptied or filled to a maximum may be determined, for example, via the power consumption of an electric motor driving the liquid delivery means. In accordance with another embodiment of the present invention, the device may be operated using virtually any desired liquid delivery means when a switch is arranged in the measuring chamber which is actuated via a float.

In accordance with another embodiment of the present invention, the fill level of liquid may be determined particularly quickly when the measuring chamber is connected to the container via an opening in the upper region of the measuring chamber and another opening in the lower region of the measuring chamber and when the lower opening is closable during filling or emptying of the measuring chamber.

The fill level in the container may be determined with particularly high accuracy when the measuring chamber is connected to the container via a plurality of openings arranged at different levels. It is possible thereby, for example, for liquid to escape through the openings into the container during filling of the measuring chamber. This lengthens the time interval required to fill the measuring chamber, with the result that measuring errors in the determination of the start and end of the measurement exert a small influence on the fill level determined.

In another embodiment of the present invention, the accuracy of the fill level determined is increased by using a liquid delivery means having a pressure reservoir. The device according to the invention therefore needs no delivery pump of its own.

The device according to the invention may be operatively arranged for driving the liquid delivery means for emptying the measuring chamber at prescribed time intervals, thereby determining the time required for emptying the measuring chamber at the prescribed time intervals.

In accordance with yet another embodiment of the present invention, the evaluation unit comprises a memory including volume/level characteristics determined for filling or emptying, and/or for fill level values last determined. As a result, the fill level in the container may be determined with very high accuracy even when the measuring chamber has varying cross sections. A section of the measuring chamber which has a large cross section may be used to determine the fill level in this region with particular exactitude. A low residual A quantity of fuel may be determined particularly precisely in the case of the device provided for measuring the fill level in the fuel tank when the measuring chamber has a large cross section in the area proximate the bottom of the container.

In accordance with a further embodiment of the present invention, a temperature sensor may be arranged in the container and connected to the evaluation unit so that the influence of temperature on the viscosity of the liquid in the container may easily be accounted for. This embodiment is especially useful for measuring the fill level of fuel in motor vehicles, since the viscosity of fuel has a strong dependence on temperature fluctuations.

Pressure changes in the liquid filling the measuring chamber may be produced during operation of the liquid delivery means which may, for example, comprise a delivery unit including a separate pump or pressure reservoir. The pressure changes produce falsification of the values determined. This falsification may be countered by arranging a pressure sensor at the outlet of the liquid delivery means or in the line leading to the measuring chamber, and connecting it to the evaluation unit to account for pressure changes.

The device according to the invention is of particularly cost effective design when an electrically operable delivery unit inserted in the fuel tank of the motor vehicle is designed as liquid delivery means.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 1:
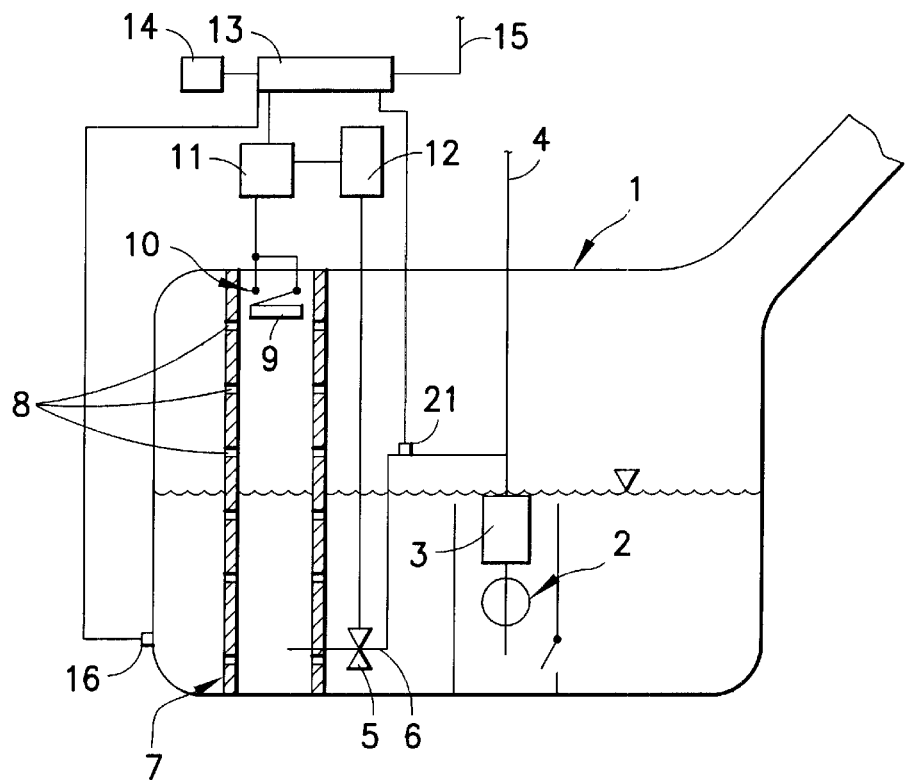
FIG. 1 is a schematic illustration of a device according to an embodiment of the present invention for detecting a fill level in a container.

Referring to FIG. 1, a container 1 designed as a fuel tank for a motor vehicle has a device according to an embodiment of the present invention for detecting the fill level of liquid (i.e. fuel) in the container 1. A delivery unit 2 which delivers liquid from the container 1 into a pressure reservoir 3 is arranged in the container 1. From the pressure reservoir 3, the fuel passes via a first feed line 4 to an internal combustion engine (not illustrated) of the motor vehicle. A second feed line 6 is connected to the first feed line 4 and is routed to a bottom region of a tubular measuring chamber 7. A control valve 5 is arranged in the second feed line 6 for selectively blocking the second feed line 6. The measuring chamber 7 comprises a wall with a plurality of openings 8 through which fuel may freely flow. A switch 10 is arranged in an upper region of the measuring chamber 7 that is actuated by a float 9 which is fastened to the switch 10. A measuring device 11 is connected to the switch 10. The control valve 5 arranged in the second feed line 6 between the measuring chamber 7 and first feed line 4 may be controlled by a control device 12 connected to the measuring device 11. Furthermore, an evaluation device 13 having an electronic memory 14 is also connected to the measuring device 11. The evaluation unit 13 is connected to a signal line 15 leading to a display unit (not illustrated). The evaluation unit 13 further comprises a connection to a temperature sensor 16 arranged inside the container 1. The evaluation unit may optionally be connected to a pressure sensor 21 arranged between the measuring chamber and the pressure reservoir 3 or other liquid delivery means. The pressure sensor 21 may be connected at the outlet of the liquid delivery means or within the second feed line 6. The pressure sensor 21 may also determine a pressure difference between the second feed line 6 and the measuring chamber 7.

Figure 5A:
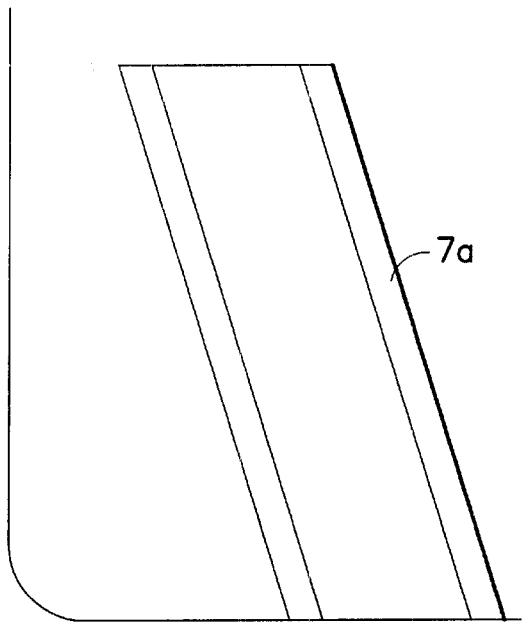
FIGS. 5a and 5b show alternate embodiments of the measuring chamber.
Figure 5B:
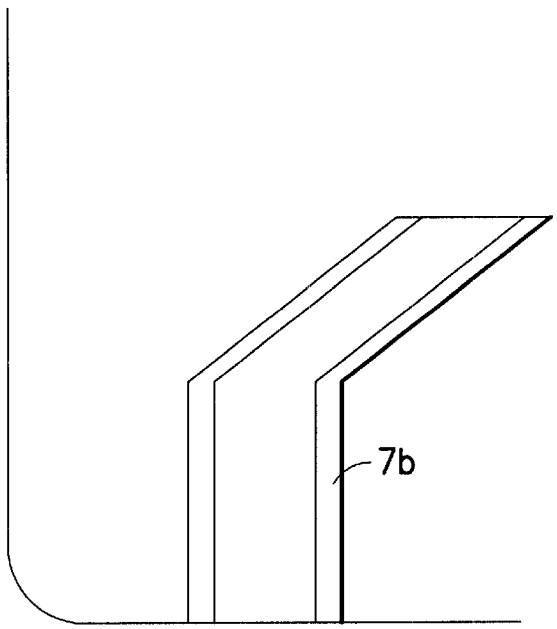

Furthermore, the measuring chamber 7 is illustrated rectilinearly to simplify the drawing. However, the measuring chamber 7 may also be slanted, bent, have varying cross sections, or have any shape required for a particular application. An example of a slanted measuring chamber 7a is shown in FIG. 5a and an example of a bent measuring chamber 7b is shown in FIG. 5b.

Figure 2A:
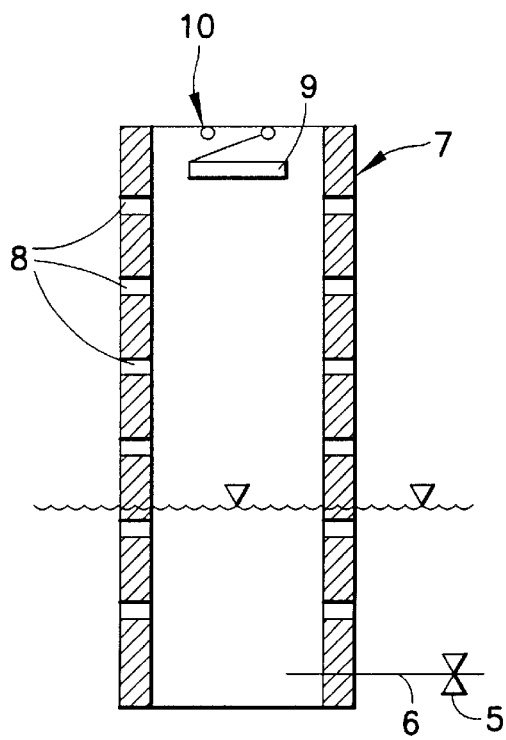
FIGS. 2a and 2b are schematic illustrations of a measuring chamber during two steps of a method according to the present invention for detecting a fill level in a container.
Figure 2B:
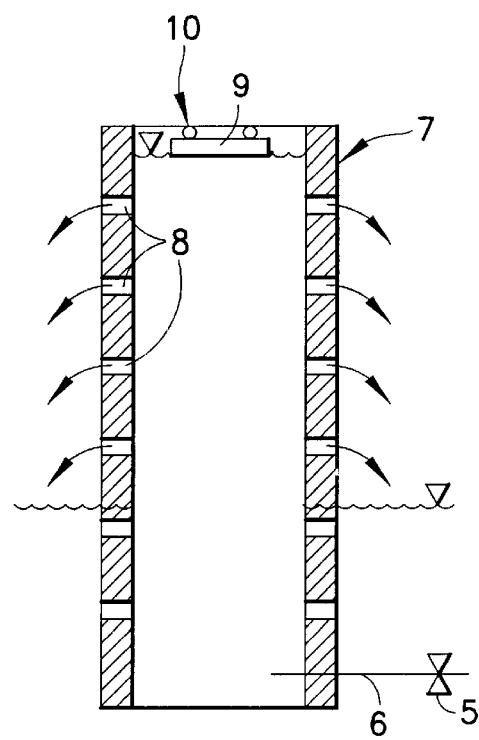

The measuring chamber 7 is shown in a more detailed view in FIG. 2 in a state before the start of measurement of the fill level of liquid in the container 1. In this state, the control valve 5 in the second feed line 6 which connects the measuring chamber 7 to the pressure reservoir 3 is closed. Fuel in the container 1 is free to flow into and out of the measuring chamber 7 via the openings 8 in the wall thereof. Consequently, the fill level in the measuring chamber 7 corresponds to the fill level in the container 1. To determine the fill level of the container 1, the control valve 5 is opened. Liquid thereby flows into the measuring chamber 7 from the pressurized reservoir 3 until the liquid in the measuring chamber 7 reaches a target lever which is the completely filled level in the embodiment of FIGS. 1, 2a, and 2b. The completely filled state of the measuring chamber 7 is illustrated in FIG. 2b. When the measuring chamber 7 is completely filled, the float 9 is pressed toward the top of the measuring chamber and closes the switch 10. The time interval between the opening of the control valve 5 and the actuation of the switch 10 by the liquid level is detected by the measuring device 11 illustrated in FIG. 1. A signal representing the detected time interval is transmitted to the evaluation unit 13 and the time interval is compared with previously determined volume/level characteristics stored in the memory 14. Volume/level characteristics of the container 1 may be determined via experiments and stored in the memory 14. Thus, the volume of liquid present in the container 1 may be calculated from the volume/level characteristics and the determined fill level given a known geometry of the container 1.

Since the viscosity of fuel is a function of temperature, a plurality of characteristics for different temperatures may be stored in the memory 14, and the appropriate characteristic may be selected in accordance with the values of the temperature sensor 16. The openings 8 in the wall of the measuring chamber 7 are operatively designed to lengthen the time interval required for filling the measuring chamber 7 at a fixed pressure difference between the pressure reservoir 3 and the inner pressure in the container 1, thereby increasing the accuracy of the. measurement of time required to fill or empty the measuring chamber 7.

Figure 3:
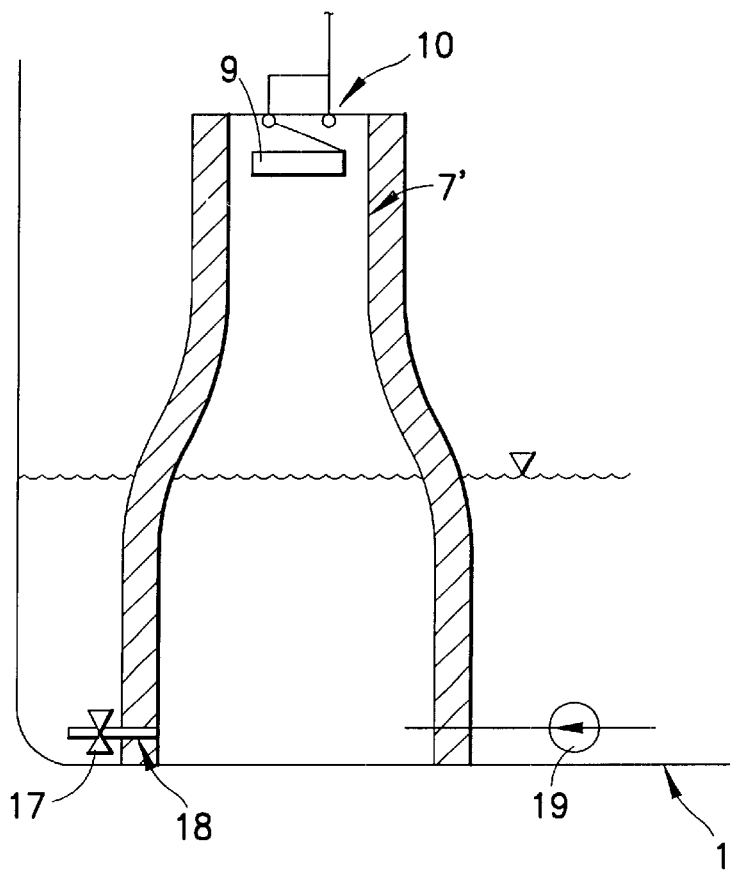
FIG. 3 is a schematic illustration of a measuring chamber according to another embodiment of the present invention.

FIG. 3 shows a further embodiment of the device according to the invention. In the device according to FIG. 3, the measuring chamber 7' is open at the top and has a single opening 18 arranged proximate a bottom region of the measuring chamber 7' which is selectively closed by a control valve 17 connected at the single opening 18. Furthermore, a separately driven pump 19 is connected for filling the measuring chamber 7'. Before the fill level in the container 1 is measured, the control valve 17 is open so that, as illustrated in the drawing, the fill levels present inside the container 1 and inside the measuring chamber 7' are equalized. A first step when starting to measure the fill level is to close the control valve 17 and thereupon to begin operating the pump 19. The measuring chamber 7' is subsequently filled with liquid until, as described above with reference to the device according to FIG. 1, the liquid level in the measuring chamber 7' actuates the switch 10. The evaluation of the time interval for filling the measuring chamber is performed as indicated with the device according to FIGS. 1 and 2. The measuring chamber 7' of FIG. 3 has a variable cross section. The liquid level rises more slowly in the region of the larger cross section than in the region of the smaller cross section. Therefore, the determination of the fill level in the region of the large cross section is more accurate than the fill level determined in the region of the small cross section.

Figure 4:
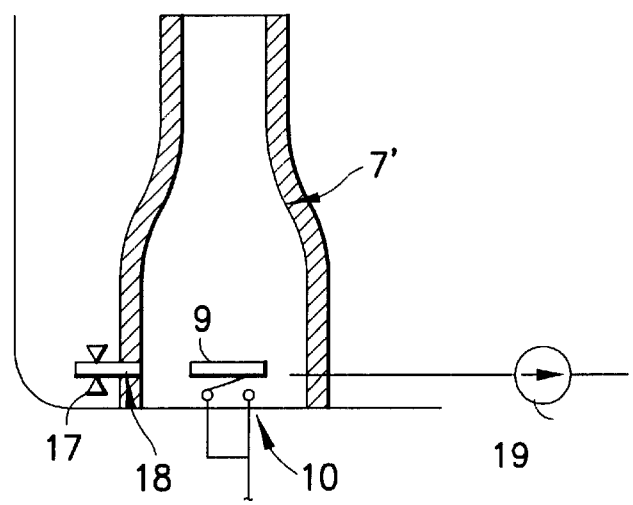
FIG. 4 is a schematic illustration of another embodiment of the present invention in which a switch and float are positioned at a bottom of a measuring chamber.

It should be noted that the liquid may alternatively be suctioned out of the DM measuring chamber 7' or the measuring chamber 7 for the purpose of measuring the fill level. In this alternative embodiment, the switch 10 may be arranged on the bottom of the measuring chamber 7' as shown in FIG. 4 for activation upon emptying of the measuring chamber 7'.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for determining a fill level of a liquid in a container comprising the steps of:
   (a) operating liquid delivery means for one of emptying and filling a measuring chamber arranged in the container to a target level at a known pressure difference between the container and the liquid delivery means, the measuring chamber extending above the maximum level of the container;
   (b) determining the time required for the one of emptying and filling the measuring chamber to the target level; and
   (c) converting the time determined in said step (b) into the fill level in the container.

2. The method of claim 1, wherein the target level comprises one of a completely full level and a completely empty level.

3. The method of claim 1, wherein said step (c) comprises comparing the time determined in said step (b) with previously determined volume/level characteristics.

4. A device for determining a fill level of a liquid in a container, comprising:
   a measuring chamber arranged within the container such that said measuring chamber extends above a maximum fill level of the container;
   liquid delivery means for delivering said liquid, wherein said liquid delivery means is operatively connected to said measuring chamber for one of filling and emptying said measuring chamber;
   a measuring device operatively arranged for determining a time interval required for said one of filling and emptying said measuring chamber to a target level; and
   an evaluation unit operatively connected to said measuring device for converting said time interval determined by said measuring device to the fill level of the container.

5. The device of claim 4, wherein said measuring chamber comprises a tubular shape.

6. The device of claim 4, wherein said target level comprises a completely filled level of said measuring chamber and said device further comprises a switch actuatable via a float arranged at an upper boundary of said measuring chamber and operatively connected to said measuring device for determining when said measuring chamber is completely filled.

7. The device of claim 4, wherein an upper region of said measuring chamber is open to the container and a lower region of said measuring chamber is open to the container via an opening, wherein said lower opening is selectively closable during said one of filling and emptying said measuring chamber.

8. The device of claim 4, wherein an interior of said measuring chamber is connected to said container via a plurality of openings arranged at different levels of said measuring chamber.

9. The device of claim 4, wherein said liquid delivery means comprises a pressure reservoir.

10. The device of claim 4, wherein said liquid delivery means are selectively driven during prescribed time periods.

11. The device of claim 4, wherein said evaluation unit comprises a memory for storing volume/level characteristics.

12. The device of claim 4, wherein said evaluation unit comprises a memory for storing the latest determined fill level values.

13. The device of claim 4, further comprising a temperature sensor arranged in said container, wherein said evaluation unit is connected to said temperature sensor.

14. The device of claim 4, further comprising a pressure sensor arranged between said measuring chamber and said liquid delivery means, wherein said evaluation unit is connected to said pressure sensor.

15. The device of claim 4, wherein said container comprises a fuel tank of a motor vehicle and said liquid delivery means comprises an electrically operable delivery unit inserted in said fuel tank.

* * * * *